3,363,033
TRANSESTERIFICATION OF PHOSPHATES
Enrique R. Witt, Corpus Christi, Tex., assignor to Celanese Corporation, a corporation of Delaware
No Drawing. Filed Mar. 4, 1965, Ser. No. 437,308
1 Claim. (Cl. 260—982)

This invention relates to the production of high molecular weight aryl phosphates. It more particularly refers to the production of such compounds by transesterification between triaryl phosphates and various phenols. These resulting high molecular weight aryl phosphate esters are useful as thickeners, antioxidants, lubricants, extreme pressure additives, etc.

According to one aspect of this invention, certain high molecular weight phosphates, such as phosphates containing o-tert-butyl phenol, p-tert-butyl phenol, 2,6-diisopropyl phenol, o-dimethylamino-methyl phenol, bis (p-phenol) isopropane, bis (o-isopropyl p-phenol) isopropane, bis (o-methyl-o-tert-butyl-p-phenol)methane, bis (o-methyl o-tert-butyl-p-phenol) sulfide, bis (o-tert-butyl-p-methyl-o-phenol) methane, 1,1,5,5-tetra (phenol) pentane are prepared by transesterifying triaryl phosphates with the specific phenols set forth above.

The transesterification reaction is carried out by mixing a triaryl phosphate, for example tricresyl phosphate, triphenyl phosphate or trixylenol phosphate and the appropriate phenol with an esterification catalyst such as sodium metal or sodium hydroxide. Other applicable catalysts are alkali metals, their hydrides and amides. The mixture is heated to a temperature from about 100° C. to about 200° C. and at a pressure of from 10 mm. Hg to 200 mm. Hg. Upon completion of the reaction, the desired product can be recovered by distillation, extraction or other conventional unit operations. Generally speaking, it has been found desirable to provide the product by removing cresol or any unreacted triaryl phosphate from the reaction mixture thereby leaving the desired product.

The following examples are given by way of illustration of the instant invention and in no way limiting the scope thereof. Parts and percentages are given by weight unless specified to the contrary.

EXAMPLE I 500 parts of tricresyl phosphate and 101.8 parts of o-tert-butyl phenol were azeotroped with benzene to complete dryness. The solution was cooled, 1 part of sodium metal added, and the benzene stripped under vacuum. Pot temperature was increased and pressure reduced, resulting in the distillation of cresylic acid, which began at 130–190° C. and 20–1 mm. HgA. Vacuum flashing of the phenol was continued to the point of incipient phosphate distillation (ca. 280° C. at 1 mm. HgA). The reaction mixture was then cooled, to ca. 100° C., 5 ml. of dimethyl sulfate added, and again vacuum stripped to ca. 150° C. at 1 mm. HgA, when most of this reagent flashed over. The pot residue was then washed as follows: (a) a preliminary wash with water containing Dry Ice, to provide a $CO_2$ blanket for the safe destruction of any remaining sodium metal; (b) three dilute caustic (about 2%) washes; (c) one water wash with phosphoric acid acidulation to a pH of 2; (d) one water wash; (e) a permanganate treatment, followed by bleaching with a combination of oxalic acid and sodium sulfite; and (f) three water washes. The washed residue had a viscosity of 5.0 centistokes at 210° F.

EXAMPLE II 500 parts of tricresylphosphate and 101.8 parts of p-tert-butyl phenol were azeotroped with benzene to complete dryness. The solution was cooled, 1 part of sodium metal added, and the benzene stripped under vacuum. Pot temperature was increased and pressure reduced, resulting in the distillation of cresylic acid, which began at 130–190° C. and 20–1 mm. HgA. Vacuum flashing of phenol was continued to the point of incipient phosphate distillation (ca. 280° C. at 1 mm. HgA). The reaction mixture was then cooled, to ca. 100° C., 5 ml. of dimethyl sulfate added, and again vacuum stripped to ca. 150° C. at 1 mm. HgA, when most of this reagent flashed over. The pot residue was then washed. Its viscosity was 5.17 centistokes at 210° F.

EXAMPLE III 500 parts of tricresylphosphate and 120.7 parts of 2,6-diisopropyl phenol were azeotroped with benzene to complete dryness. The solution was cooled, 1 part of sodium metal added, and the benzene stripped under vacuum. Pot temperature was increased and pressure reduced, resulting in the distillation of cresylic acid, which began at 130–190° C. and 20–1 mm. HgA. Vacuum flashing of phenol was continued to the point of incipient phosphate distillation (ca. 280° C. at 1 mm. HgA). The reaction mixture was then cooled, to ca. 100° C., 5 ml. of dimethyl sulfate added, and again vacuum stripped to ca. 150° C. at 1 mm. HgA, when most of this reagent flashed over. The pot residue was then washed. Its voscosity was 5.7 centistokes at 210° F.

EXAMPLE IV 500 parts of tricresylphosphate and 102.4 parts of o-dimethylaminomethyl phenol were azeotroped with benzene to complete dryness. The solution was cooled, 1 part of sodium metal added, and the benzene stripped under vacuum. Pot temperature was increased and pressure reduced, resulting in the distillation of cresylic acid, which began at 130–190° C. and 20–1 mm. HgA. Vacuum flashing of phenolics was continued to the point of incipient phosphate distillation (ca. 280° C. at 1 mm. HgA). The reaction mixture was then cooled, to ca. 100° C., 5 ml. of dimethyl sulfate added, and again vacuum stripped to ca. 150° C. at 1 mm. HgA, when most of this reagent flashed over. The pot residue was then washed. Its viscosity was 20.91 centistokes at 210° F.

EXAMPLE V 500 parts of tricresylphosphate and 77.3 parts of bis (p-phenol) isopropane were azeotroped with benzene to complete dryness. The solution was cooled, 1 part of sodium metal added, and the benzene stripped under vacuum. Pot temperature was increased and pressure reduced, resulting in the distillation of cresylic acid, which began at 130–190° C. and 20–1 mm. HgA. Vacuum flashing of phenolics was continued to the point of incipient phosphate distillation (ca. 280° C. at 1 mm. HgA). The reaction mixture was then cooled, to ca. 100° C., 5 ml. of dimethyl sulfate added, and again vacuum stripped to ca. 150° C. at 1 mm. HgA, when most of this reagent flashed over. The pot residue was then washed. Its viscosity was 13.42 centistokes at 210° F.

EXAMPLE VI 500 parts of tricresylphosphate and 105.7 parts of bis (o-isopropyl p-phenol) isopropane were azeotroped with benzene to complete dryness. The solution was cooled, 1 part of sodium metal added, and the benzene stripped under vacuum. Pot temperature was increased and pressure reduced, resulting in the distillation of cresylic acid, which began at 130–190° C. and 20–1 mm. HgA.' Vacuum flashing of phenol was continued to the point of incipient phosphate distillation (ca. 280° C. at 1 mm. HgA). The reaction mixture was then cooled, to ca. 100° C., 5 ml. of dimethyl sulfate added, and again vacuum stripped to ca. 150° C. at 1 mm. HgA, when most of this reagent flashed over. The pot residue was then washed. Its viscosity was 16.41 centistokes at 210° F.

EXAMPLE VII 500 parts of tricresylphosphate and 115.3 parts of bis (o-methyl o-tert-butyl-p-phenol) methane were azeotroped with benzene to complete dryness. The solution was cooled, 1 part of sodium metal added, and the benzene stripped under vacuum. Pot temperature was increased and pressure reduced, resulting in the distillation of cresylic acid, which began at 130–190° C. and 20–1 mm. HgA. Vacuum flashing of phenol was continued to the point of incipient phosphate distillation (ca. 280° C. at 1 mm. HgA). The reaction mixture was then cooled, to ca. 100° C., 5 ml. of dimethyl sulfate added, and again vacuum stripped at ca. 150° C. at 1 mm. HgA, when most of this reagent flashed over. The pot residue was then washed. Its viscosity was 25.60 centistokes at 210° F.

EXAMPLE VIII 500 parts of tricresylphosphate and 121.4 parts of bis (o-methyl o-tert-butyl-p-phenol) sulfide were azeotroped with benzene to complete dryness. The solution was cooled, 1 part of sodium metal added, and the benzene stripped under vacuum. Pot temperature was increased and pressure reduced, resulting in the distillation of cresylic acid, which began at 130–190° C. and 20–1 mm. HgA. Vacuum flashing of phenol was continued to the point of incipient phosphate distillation (ca. 280° C. at 1 mm. HgA). The reaction mixture was then cooled, to ca. 100° C., 5 ml. of dimethyl sulfate added, and again vacuum stripped to ca. 150° C. at 1 mm. HgA, when most of this reagent flashed over. The pot residue was then washed. Its viscosity was 14.69 centistokes at 210° F.

EXAMPLE IX 500 parts of tricresylphosphate and 115.3 parts of bis (o-tert-butyl p-methyl o-phenol) methane were azeotroped with benzene to complete dryness. The solution was cooled, 1 part of sodium metal added, and the benzene stripped under vacuum. Pot temperature was increased and pressure reduced, resulting in the distillation of cresylic acid, which began at 130–190° C. and 20–1 mm. HgA. Vacuum flashing of phenol was continued to the point of incipient phosphate distillation (ca. 280° C. at 1 mm. HgA). The reaction mixture was then cooled, to ca. 100° C., 5 ml. of dimethyl sulfate added, and again vacuum stripped to ca. 150° C. at 1 mm. HgA, when most of this reagent flashed over. The pot residue was then washed. Its viscosity was 9.52 centistokes at 210° F.

EXAMPLE X 500 parts of tricresylphosphate and 74.7 parts of 1,1,5,5-tetra (phenol) pentane were azeotroped with benzene to complete dryness. The solution was cooled, 1 part of sodium metal added, and the benzene stripped under vacuum. Pot temperature was increased and pressure reduced, resulting in the distillation of cresylic acid, which began at 130–190° C. and 20–1 mm. HgA. Vacuum flashing of phenol was continued to the point of incipient phosphate distillation (ca. 280° C. at 1 mm. HgA). The reaction mixture was then cooled, to ca. 100° C., 5 ml. of dimethyl sulfate added, and again vacuum stripped to ca. 150° C. at 1 mm. HgA, when most of this reagent flashed over. The pot residue was then washed. Its viscosity was 51.38 centistokes at 210° F.

The embodiments of the invention in which an exclusive property or privilege is claimed are defined as follows:

1. The process of producing high molecular weight aryl phosphates which comprises transesterifying a triaryl phosphate selected from the group consisting of tricresyl phosphate, triphenyl phosphate and trixylenol phosphate with a phenol selected from the group consisting of o-tert-butyl phenol, p-tert-butyl phenol, 2,6-diisopropyl phenol, o-dimethylaminomethyl phenol, bis (p-phenol) isopropane, bis (o-isopropyl p-phenol) isopropane, bis (o-methyl o-tert-butyl p-phenol) methane, bis (o-methyl o-tert-butyl p-phenol) sulfide, bis (o-tert-butyl p-methyl o-phenol) methane, 1,1,5,5-tetra (phenol) pentane, at a temperature of from 100° C. to 200° C. and a pressure of from 10 mm. Hg to 200 mm. Hg, in the presence of a sodium metal catalyst.

No references cited.

CHARLES B. PARKER, *Primary Examiner.*

A. H. SUTTO, *Assistant Examiner.*